United States Patent [19]

Lai et al.

[11] Patent Number: 4,764,887

[45] Date of Patent: Aug. 16, 1988

[54] CARRY-BYPASS ARITHMETIC LOGIC UNIT

[75] Inventors: Chingwei S. Lai, San Jose; Florence S. Lee, Sunnyvale, both of Calif.

[73] Assignee: Advanced Micro Devices, Inc., Sunnyvale, Calif.

[21] Appl. No.: 762,581

[22] Filed: Aug. 2, 1985

[51] Int. Cl.⁴ ............................................. G06F 7/50
[52] U.S. Cl. .................................................... 364/787
[58] Field of Search ................ 364/768, 784, 786, 787

[56] References Cited

U.S. PATENT DOCUMENTS

| | | | |
|---|---|---|---|
| 3,925,651 | 12/1975 | Miller | 364/787 |
| 3,925,652 | 12/1975 | Miller | 364/787 |
| 3,987,291 | 10/1986 | Gooding et al. | 364/787 |
| 4,559,608 | 12/1985 | Young et al. | 364/786 |
| 4,584,661 | 4/1986 | Grindland | 364/787 |
| 4,638,300 | 1/1987 | Miller | 364/784 |

Primary Examiner—Gary V. Harkcom
Assistant Examiner—Dale M. Shaw
Attorney, Agent, or Firm—Patrick T. King; Warren M. Becker; J. Vincent Tortolano

[57] ABSTRACT

An arithmetic logic circuit comprising a plurality of cells of conventional logic circuits for performing logical and arithmetic operations in combination with a kill circuit in each one of the cells which is responsive to bits of first and second operands T and B, a clock signal $\emptyset1^*$, a propagate bit P and a carry-in bit $C_{in}$ for selectively providing a carry-out bit $C_{out}$ and/or a carry-bypass circuit coupled to each one of a plurality of sets of cells which is responsive to propagate bits P from said cells in each set, a clock signal $\emptyset2^*$ and a carry-in bit $C_{in}$ for allowing said carry-in bit $C_{in}$ to bypass selected ones of the cells.

16 Claims, 5 Drawing Sheets

CARRY-BYPASS ARITHMETIC LOGIC UNIT

BACKGROUND OF THE INVENTION

1. Field of the Invention

The present invention relates to arithmetic and logic circuits in general and to a multiple cell CMOS arithmetic logic unit comprising carry-bypass and active restore circuitry for providing outputs corresponding to selected arithmetic and logic operations in particular.

2. Description of Prior Art

Logic circuits comprise arrays of transistors which are responsive to combinations of data bits for providing one or more outputs corresponding to predetermined logical operations performed on the data bits. In a multiple logic operation circuit of the type to which the present invention relates, the selection of the logical operation to be performed on the data bits is typically controlled by a plurality of control or code bits.

An arithmetic unit comprises an array of transistors which is responsive to the bits of a first and a second operand for providing one or more outputs corresponding to selected arithmetic operations such as addition and subtraction.

Typically, a subtraction operation is performed by adding the two's complement of one of the operands, i.e. the subtrahend, to the positive value of the other operand, i.e. the minuend.

In general, an addition operation involves a circuit for providing a carry bit. Since, as described above, a subtraction operation is actually an addition operation as far as the arithmetic unit is concerned, it is apparent that both the addition and the subtraction operations involve the use of a carry bit circuit.

Heretofore, circuits for providing carry bits in an addition operation typically comprise either the well known Manchester-type carry chain circuit or a circuit which comprises a carry-look-ahead technique. However, both of these types of circuits have certain well known disadvantages.

In a multiple cell arithmetic unit comprising a Manchester-type carry chain circuit, the propagation of the carry bit from the least significant bit cell to the most significant bit cell requires the carry bit to be propagated from one cell to another through one or more transistors in each cell. Since each transistor through which the carry bit is propagated delays the propagation of the carry bit, the number of cells in the chain determines the maximum propagation delay of the carry bit in the circuit. For example, in a 32 cell arithmetic unit for operating on 32 bit operands comprising 32 pass gates for propagating a carry bit from the least significant bit cell to the most significant bit cell, the propagation delay in the carry chain corresponds to 32 gate delays. Such delays result in an undesirably long time to perform an addition operation.

The principal disadvantage of arithmetic units which comprise the carry-look-ahead technique is that a typical implementation of the technique requires an undesirably large number of transistors and a correspondingly large loading in the driver stages.

In many transistor circuits, particularly those comprising CMOS transistors, the turn-on time of the transistor is typically significantly longer than the turn-off time. Consequently, multiple cell arithmetic units comprising circuits which rely on turning on a transistor for propagating a carry bit from a least significant bit cell to a most significant bit cell result in undesirably long carry bit propagation delays.

SUMMARY OF THE INVENTION

In view of the foregoing, a principal object of the present invention is a novel multiple cell arithmetic logic unit for performing selected logic and arithmetic operations.

Another object of the present invention is an arithmetic logic unit as described above comprising a novel multiple stage carry-bypass circuit which is used to bypass cells in the unit for minimizing carry bit propagation delays.

Still another object of the present invention is an arithmetic logic unit as described above comprising an active restore or precharging circuit and discharging circuit in each cell for reducing carry bit propagation delays.

In a preferred embodiment of the present invention comprising a 32 bit arithmetic logic unit for operating on 32 bit data words and operands, there are provided 32 cells. In each cell there is provided a propagate circuit, a kill circuit and a sum circuit comprising a plurality of transistors which are responsive to a first and a second data or operand bit T and B, a plurality of code bits G0-G4 and a carry bit C. Code bits G0-G3 comprise the codes for 16 different logic operations. Code bit G4 is used for selecting arithmetic or logic operations. Carry bit C is provided and used during the addition operation.

The 32 cells in the arithmetic logic unit are organized in sets of four cells each. Coupled to each set of four cells there is provided a carry-bypass circuit comprising a carry-bypass four-cell circuit and a carry-bypass two-cell circuit. The carry-bypass circuit is responsive to certain inputs from the cells to which it is coupled for selectively allowing a carry bit to bypass either two or four of the cells in a set during an arithmetic, i.e. addition, operation to thereby minimize carry bit propagation delays.

In the propagate circuit, the transistors provided therein are responsive to the first and second data or operand bits T and B and the code bits G0-G3 for providing a propagate bit P.

In the sum circuit, the transistors provided therein are responsive to the propagate bit P, the code bit G4 and the carry bit C for providing an output NS where $$NS = P \oplus G4 \cdot C$$

In a logical operation, G4=0, therefore $$NS = P$$

In an arithmetic operation, G4=1, therefore $$NS = P \oplus C$$

In the kill circuit, the transistors provided therein are responsive to the propagate bit P, the carry bit C and the first and second operand bits T and B for selectively providing a carry-out bit $C_{out}$. A principal feature of the kill circuit is that a node A on the carry-out bit line on which the carry-out bit $C_{out}$ is provided is normally precharged to a logical one or high level. Thereafter, node A is discharged to ground directly within the cell or through a lower order cell if the cell involved does not preserve the carry-out bit $C_{out}$.

The purpose of precharging node A is to take advantage of the fact that transistors, in particular CMOS transistors, of the type used in the present invention, have a significantly shorter turn-off time than turn-on time. Accordingly, by discharging instead of charging node A, effective carry bit propagation delays are significantly minimized.

DETAILED DESCRIPTION OF THE INVENTION

Referring to FIGS. 1–3, 4A and 4B there is provided in accordance with the present invention an arithmetic logic unit (ALU) designated generally as 1. In the logic unit 1 there is provided 32 identical stages or cells designated 0-31, a plurality of eight identical carry-bypass circuits 33-40, a plurality of 32 data/operand bit input lines designated T00-T31, for receiving the bits of a first data word or operand T, a plurality of 32 data/operand bit input lines designated B00-B31 for receiving the bits of a second data word or operand B, a line designated $\emptyset 2^*$ for receiving a clock signal $\emptyset 2^*$, a line designated $\emptyset 1$ for receiving a clock signal $\emptyset 1$, a line designated $\emptyset 1^*$ for receiving a clock signal $\emptyset 1^*$ which is an inverted form of the clock signal $\emptyset 1$, a plurality of five input lines designated G0-G4 for receiving code bits G0-G4, an input line designated $C_{in}$ for receiving a carry-in bit $C_{in}$ and a plurality of 32 output lines designated NS00-NS31 for providing 32 sum bits NS00-NS31.

Figure 1:
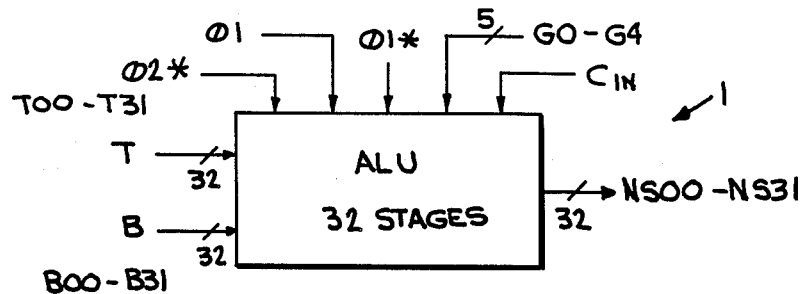
FIG. 1 is a block diagram of a 32 stage arithmetic logic unit (ALU) according to the present invention.
Figure 2:
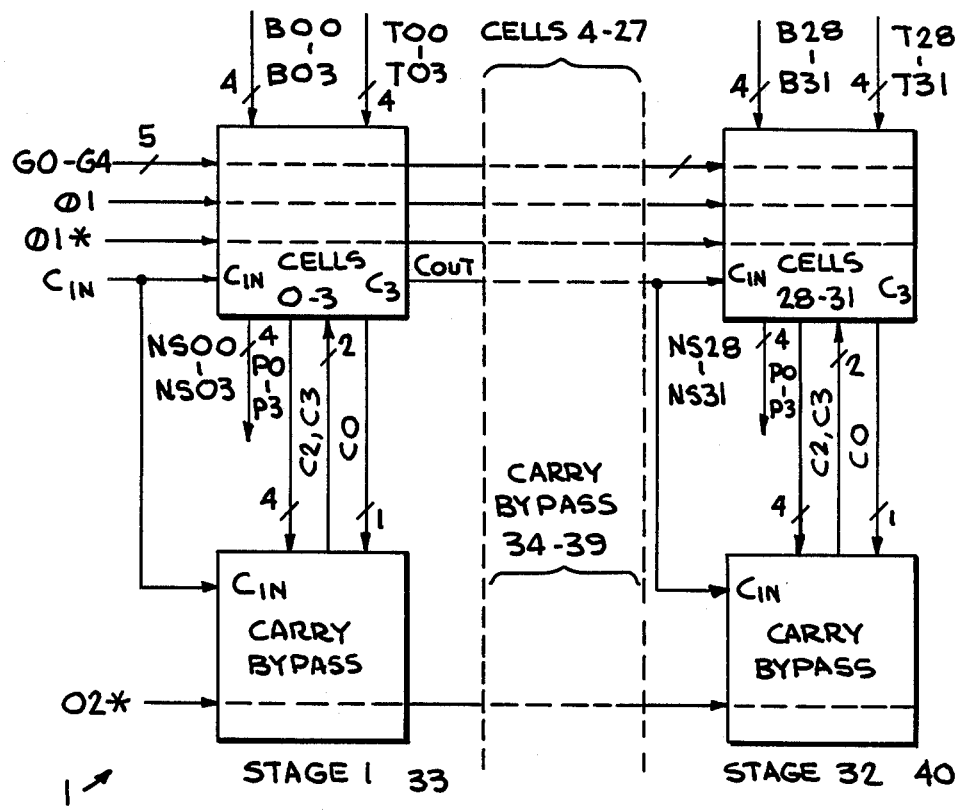
FIG. 2 is a more detailed block diagram of the ALU of FIG. 1, showing sets of four cell coupled to a carry-bypass circuit according to the present invention.

As shown more clearly in FIG. 2, each of the carry-bypass circuits 33-40 are coupled to a different set of four of the cells 0-31. For example, carry-bypass circuit 33 is coupled to the four lowest order cells 0-3 and carry-bypass circuit 40 is coupled to the four highest order cells 28-31. Each of the carry-bypass circuits 33-40 are coupled to their respective set of four cells by four propagate bit lines designated P0-P3 and four carry-bit lines designated $C_{in}$, C0, C2 and C3.

For convenience, the carry-in bit input to the lowest order cell in each set of four cells and the carry-bypass circuit coupled thereto is designated $C_{in}$. The carry-bit output from the first of the set of four cells is designated C0. The carry-bit output of the second of the four cells is designated C1. The carry-bit output of the third of the four cells is designated C2 and the carry-bit output of the fourth of the set of four cells is designated C3, as shown more clearly in FIG. 4B. In practice, the carry-out bit of the second cell in each set of four cells is not used externally of the cell and therefore the carry-output line C1 is omitted from the drawing, as shown in FIG. 4B.

While the data/operand bit lines B00-B31 and T00-T31 and the sum bit output lines NS00-NS31 are each coupled to their respective cell, all of the cells 0-31 are coupled in common to the code bit lines G0-G4, the clock signal line $\emptyset 1$ and the clock signal line $\emptyset 1^*$. Similarly, all of the carry-bypass circuits 33-40 are coupled in common to the clock signal line $\emptyset 2^*$, as shown in FIG. 2.

Since each of the cells 0-31 are substantially identical, only cell 0 will be described in detail.

Figure 3:
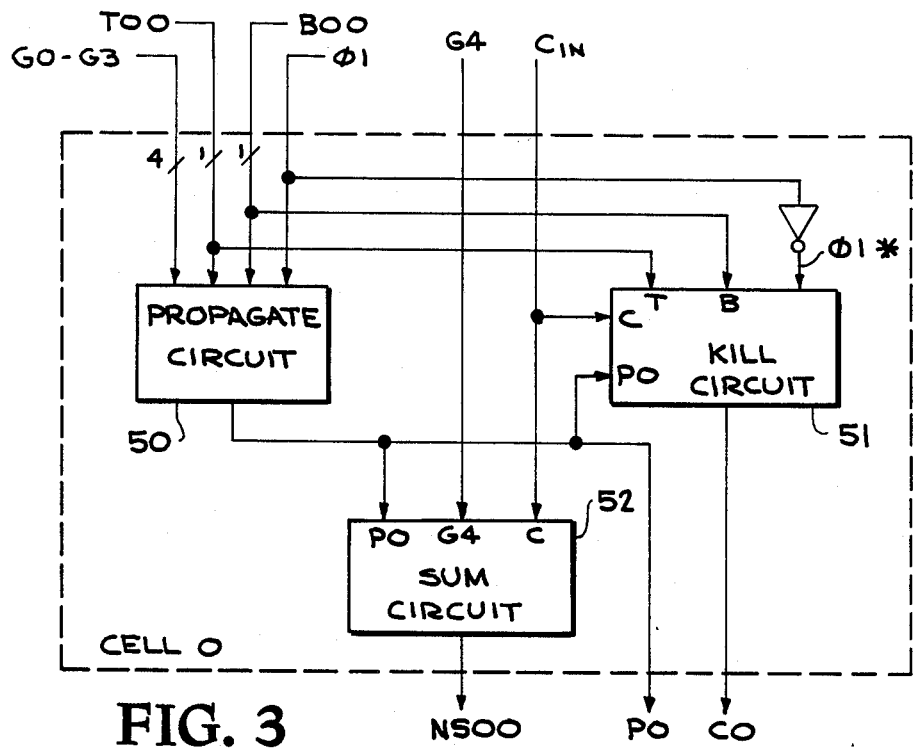
FIG. 3 is a block diagram of a propagate, kill and sum circuit located in each of the cells of the apparatus of FIG. 2 according to the present invention.
Figure 4A:
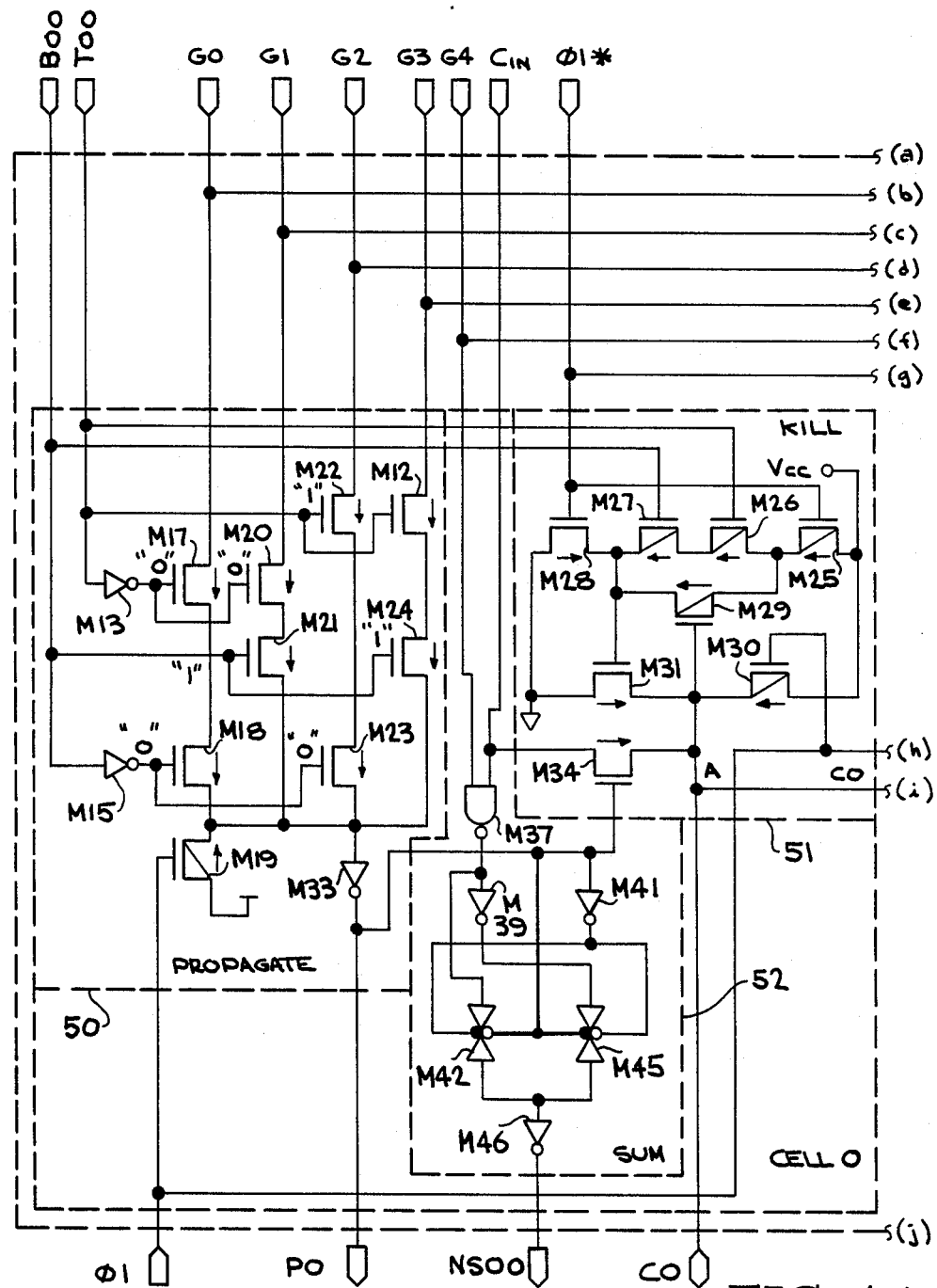
FIGS. 4A and 4B are block diagrams of a set of four cells with a detailed schematic of one of the cells of the apparatus of FIG. 2 according to the present invention.
Figure 4B:
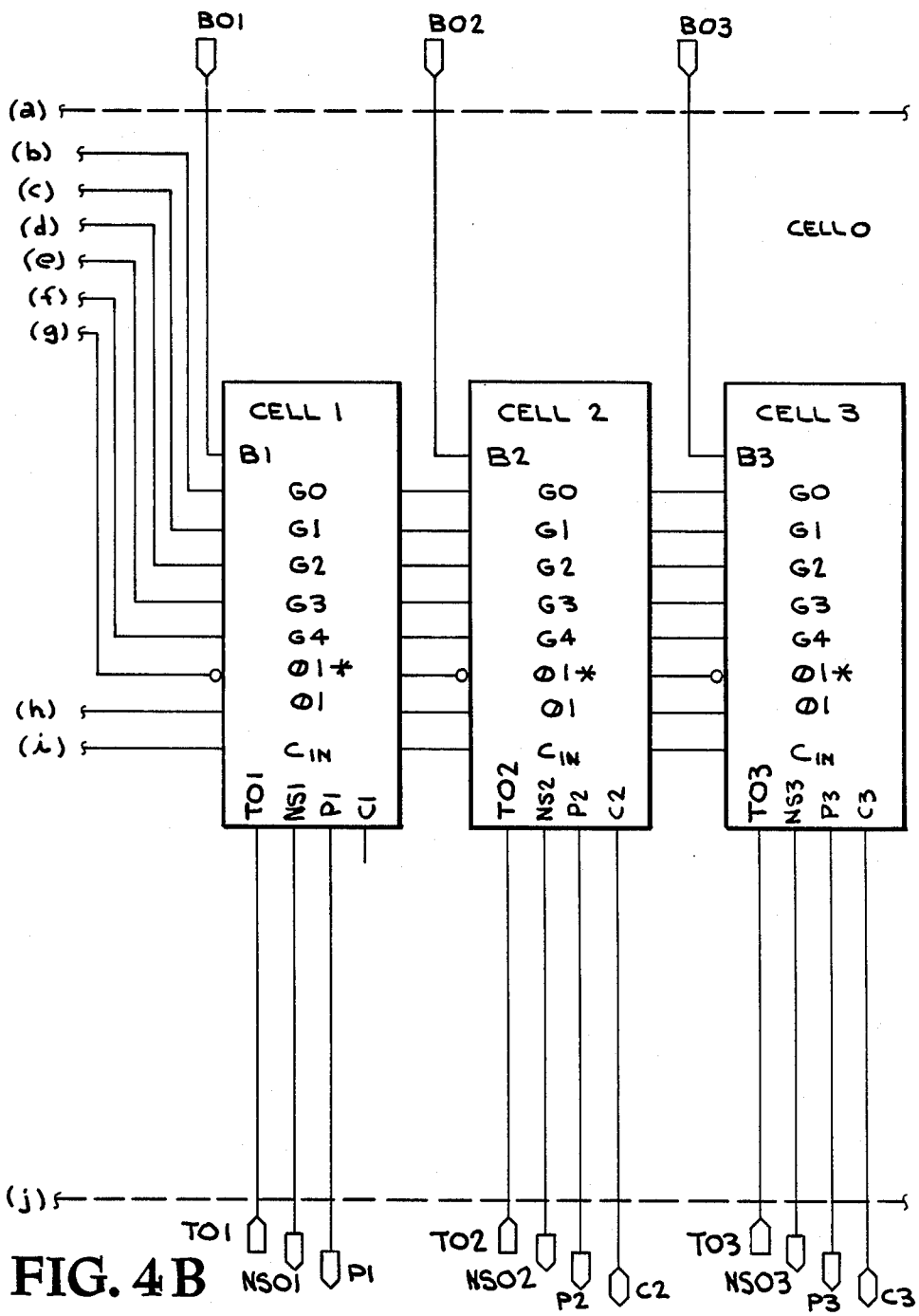

Referring to FIGS. 3 and 4A, there is provided in cell 0 a propagate circuit designated generally as 50, a kill circuit designated generally as 51 and a sum circuit designated generally as 52.

As seen more clearly in FIG. 4A, there is provided in the propagate circuit 50 a pair of inverters M13 and M15 having inputs coupled respectively to the data-/operand bit input lines T00 and B00. A pair of N-channel MOS transistors M17 and M18 coupled to the code bit line G0, a pair of N-channel MOS transistors M20 and M21 coupled to the code bit line G1, a pair of N-channel MOS transistors M22 and M23 coupled to the code bit line G2 and a pair of N-channel MOS transistors M12 and M24 coupled to the code bit line G3. The gates of the transistors M22 and M12 are coupled to the data/operand bit line T00. The gates of the transistors M17 and M20 are coupled to the data/operand bit line T00 through the inverter M13. The gates of the transistors M21 and M24 are coupled to the data/operand bit line B00. The gates of the transistors M18 and M23 are coupled to the data/operand bit line B00 through the inverter M15. The transistors M17 and M18, the transistors M20 and M21, the transistors M22 and M23, and the transistors M12 and M24 are coupled in parallel to a P-channel MOS transistor M19 and an inverter M33, the output of which is coupled to the propagate bit line P0. The gate of the transistor M19 is coupled to the clock signal input line $\emptyset 1$.

In the kill circuit 51 there is provided coupled in series between a supply voltage $V_{CC}$ and ground, a plurality of series-coupled P-channel MOS transistors M25, M26 and M27 and an N-channel MOS transistor M28. The gates of the transistors M25 and M28 are coupled to the clock signal input line $\emptyset 1^*$. The gate of the transistor M26 is coupled to the data/operand bit line T00. The gate of the transistor M27 is coupled to the data/operand bit line B00. Coupled in series between the supply voltage $V_{CC}$ and ground, there is provided a P-channel MOS transistor M30 and an N-channel MOS transistor M31. Coupled across the transistors M26 and M27 there is provided a P-channel MOS transistor M29. The gate of the transistor M31 is coupled to one side of the transistor M29 and between the source and drain of the transistors M27 and M28. The gate of the transistor M29 is coupled to the carry-out bit output line C0 via a node A. The gate of the transistor M30 is coupled to the clock signal line $\emptyset 1$. An N-channel MOS transistor M34 is coupled between node A and the carry-in bit line $C_{in}$. The gate of the transistor M34 is coupled to the propagate bit line P0. The carry-out bit output line C0 is in turn coupled to the carry-in bit line $C_{in}$ of cell 1.

In the sum circuit 52 there is provided a NAND gate M37 having one input coupled to the code bit line G4 and a second input coupled to the carry-in bit line $C_{in}$. The output of the NAND gate M37 is coupled to a first input of an exclusive OR circuit comprising a pair of inverters M39 and M41 and a pair of cross-coupled transfer gates M42 and M45. A second input to the exclusive OR gate is coupled to the propagate bit line P0. The output of the exclusive OR gate is provided through an inverter M46 which is coupled to the sum output bit line NS0.

Figure 5:
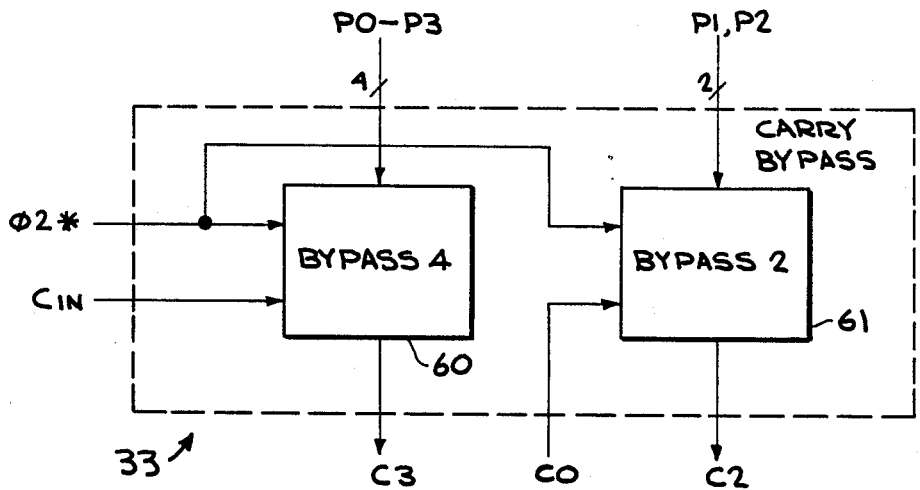
FIG. 5 is a block diagram of a carry-bypass circuit according to the present invention.

Referring to FIG. 5, there is provided in each of the carry-bypass circuits 33-40 a bypass-four-cell circuit 60 and a bypass-two-cell circuit 61.

In the circuit 60 there is provided four inputs coupled to propagate bit lines P0-P3, a clock input coupled to clock signal line ∅2*, a carry-in bit input coupled to carry-in bit line $C_{in}$ and a carry-out bit output coupled to carry-out bit line C3.

In the circuit 61 there is provided two inputs coupled to propagate bit lines P1 and P2, a clock input coupled to clock input line ∅2*, a carry bit input coupled to carry bit line C0 and a carry-out bit output coupled to carry-out bit line C2.

Figure 6:
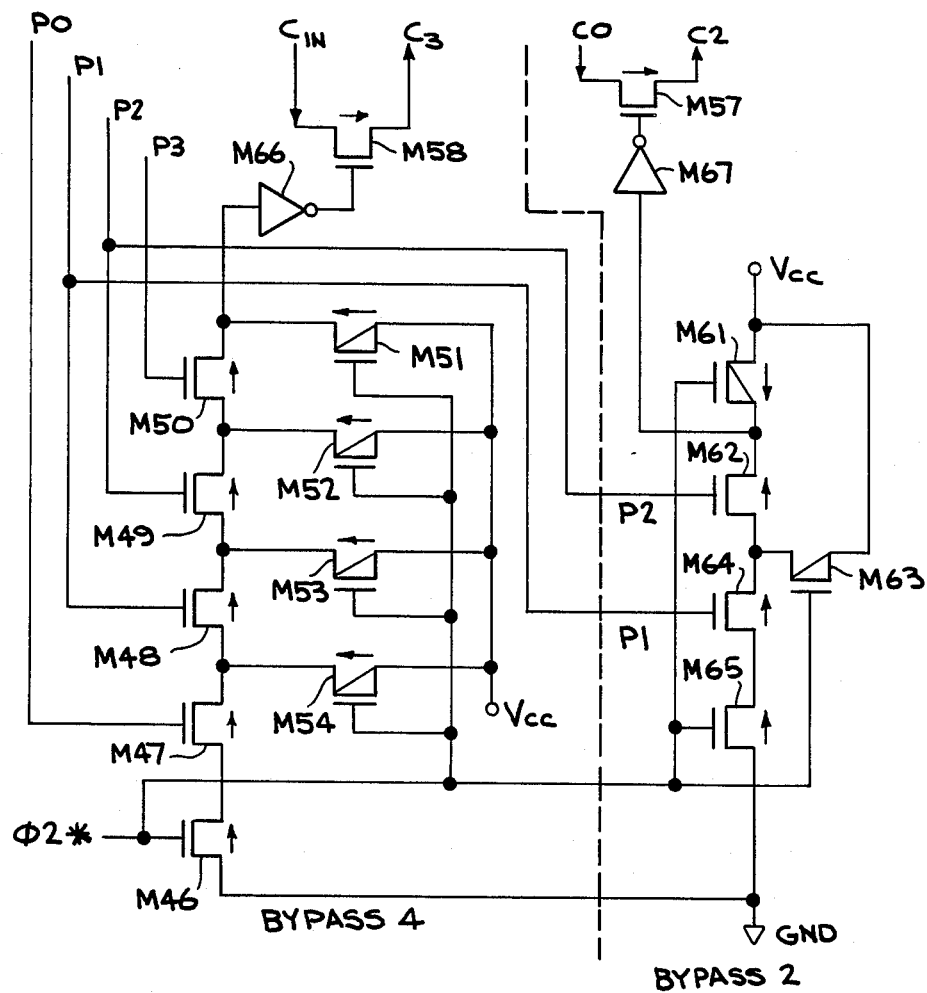
FIG. 6 is a detailed schematic of the bypass circuit of FIG. 5.

Referring to FIG. 6, in the circuit 60 there is further provided coupled in series a plurality of N-channel MOS transistors M46-M50 and an inverter M66. Coupled to a node located between the inverter M66 and the transistor M50 and a potential source $V_{CC}$, there is provided a P-channel MOS transistors M51. Coupled between the source $V_{CC}$ and a node located between transistors M49 and M50, there is provided a P-channel MOS transistor M52. Located between the source $V_{CC}$ and a node located between transistors M48 and M49, there is provided a P-channel MOS transistor M53. Located between the source $V_{CC}$ and a node located between transistors M47 and M48 there is provided a P-channel MOS transistor M54. The gates of the transistors M47-M50 are coupled to the propagate bit lines P0, P1, P2 and P3, respectively. It will be noted that for convenience, the propagate bit lines P0-P3 bear the same designation in each set of four cells among the cells 0-31, such that the bit line P0 is from the lowest order bit cell in a set while the bit line P3 is from the highest order cell in a set.

The gates of the transistors M51-M54 are coupled in common to the gate of the transistor M46 which is in turn coupled to the clock signal line ∅2*. Coupled to the output of the inverter M66 is the gate of an N-channel MOS transistor M58. One side of the transistor M58 is coupled to the carry-in bit line $C_{in}$ and the other side of the transistor M58 is coupled to the carry-out bit line C3.

In the carry-bypass circuit 61, there is provided coupled in series between a potential source $V_{CC}$ and ground a P-channel MOS transistor M61 and three N-channel MOS transistors M62, M64 and M65. A P-channel MOS transistor M63 is coupled between the potential source $V_{CC}$ and a node located between the transistors M62 and M64. The gates of the transistors M63, M61 and M65 are coupled in common to the clock signal line ∅2*. The gates of the transistors M64 and M62 are coupled to the propagate bit lines P1 and P2, respectively. An inverter M67 is coupled to a node located between the transistors M61 and M62 and the gate of a N-channel MOS transistor M57. One side of the transistor M57 is coupled to the carry-out bit line C0 of the first cell in each of the sets of four cells. The opposite end of the transistor M57 is coupled to the carry-out bit line C2 of the third cell in each set of four cells in the ALU 1.

Referring to FIG. 4A, to facilitate an understanding of the operation of the propagate circuit 50, logical 1's and 0's are shown adjacent to the gates of transistors M17, M18, M20, M21, M22, M23, M12 and M24 to show the logical level that must be applied to the data-/operand bit lines T and B in order to turn on a particular transistor. For example, if logical 0's are applied to the data/operand bit lines T and B, transistors M17 and M18 are turned on. When transistors M17 and M18 are turned on, the code bit G0 applied to the code bit line G0, passes through the transistors M17 and M18, is inverted by the inverter M33 and appears as the propagate bit P on the propagate bit line P. Similarly, if the data/operand bits T and B comprise a logical 1 and 0, respectively, transistors M22 and M23 are turned on, causing the code bit G2 to pass through and be inverted by the inverter M33 for providing the propagate bit P on the propagate bit line P. In the following table there is provided sixteen possible combinations for the code bits G0-G3 together with the corresponding logical value of the propagate bit $P_j$, where j corresponds to the data/operand bits 0-31.

| G4 | G3 | G2 | G1 | G0 | $P_j$ |
|---|---|---|---|---|---|
| 0 | 0 | 0 | 0 | 0 | 1 |
| 0 | 0 | 0 | 0 | 1 | $T_j + B_j$ |
| 0 | 0 | 0 | 1 | 0 | $T_j + \overline{B_j}$ |
| 0 | 0 | 0 | 1 | 1 | $T_j$ |
| 0 | 0 | 1 | 0 | 0 | $\overline{T_j} + B_j$ |
| 0 | 0 | 1 | 0 | 1 | $B_j$ |
| 0 | 0 | 1 | 1 | 0 | $T_j \oplus \overline{B}$ |
| 0 | 0 | 1 | 1 | 1 | $T_j \cdot B_j$ |
| 0 | 1 | 0 | 0 | 0 | $\overline{T_j \cdot B_j}$ |
| 1 | 1 | 0 | 0 | 1 | $T_j \oplus B_j$ |
| 0 | 1 | 0 | 1 | 0 | $\overline{B_j}$ |
| 0 | 1 | 0 | 1 | 1 | $T_j \cdot \overline{B_j}$ |
| 0 | 1 | 1 | 0 | 0 | $\overline{T_j}$ |
| 0 | 1 | 1 | 0 | 1 | $\overline{T_j} \cdot B_j$ |
| 0 | 1 | 1 | 1 | 0 | $\overline{T_j + B_j}$ |
| 0 | 1 | 1 | 1 | 1 | 0 |

The output of the sum circuit 52 is defined by the equation $$NS_j = P_j \oplus G4 \cdot C_{in}$$

During logical operations, code bit G4=0 such that $NS_j = P_j$.

In an arithmetic operation, i.e. only additions and subtractions are performed, only one set of code bits G0-G4 are used. They are, respectively, 1 0 0 1 1. If the arithmetic operation is an addition, the carry-in bit $C_{in}$ applied to the first cell, cell 0, is a logical 0. If the arithmetic operation is a subtraction, the carry-in bit $C_{in}$ applied to the first cell, cell 0, is a logical 1 and the bits of the operand comprising the subtrahend comprise the 1's complement of the positive value thereof. By making the carry-in bit applied to the first cell, cell 0, a 1, the 1's complement of the subtrahend is transformed to the 2's complement to enable the addition of the two operands to obtain a remainder.

The generation and propagation of carry bits that occur in addition and subtraction operations will now be described with respect to the operation of the kill circuit 51.

Referring to FIG. 4A, node A in each of the cells 0-31 is precharged to a high or logical 1 level when the clock signal ∅1 applied to the clock signal line ∅1 is low. This is accomplished by using the low level of the clock signal ∅1 to turn on transistor M30 coupling the supply $V_{CC}$ to node A. If the operation of a particular cell requires that the cell provide a carry bit, node A is maintained at a high level. On the other hand, if the operation of a particular cell is not required to provide a carry bit, node A is discharged either to ground in the cell or to ground through a lower order cell. The various conditions under which node A will be discharged will now be described.

Under one such condition when the bit line P is a logical 1, which occurs when the bits T and B comprise a logical 1 and a logical 0 and the carry-in bit from the next lower order stage is a logical 0, transistor M34 is turned on causing node A to be discharged through the next lower order cell.

Node A is also discharged when the bits T and B are both 0. When the bits T and B are both 0, transistors M27 and M26 are turned on. When the clock signal ∅1* goes low, transistor M25 is turned on causing the potential $V_{CC}$ to be applied through transistors M25-M27 to the gate of the transistor M31 turning on the transistor M31 and causing node A to discharge to ground through transistor M31.

An important feature of the invention is that as node A discharges and approaches a voltage of 1.5 volts, transistor M29 is also turned on. Turning on transistor M29 applies a greater voltage to the gate of transistor M31, turning it on even harder and causing node A to discharge even more quickly. Under all other conditions, i.e. input combinations, node A is retained at a high level, as shown by the following table.

| ∅1 | T | B | $C_{in}$ | P | $C_{out}$ |
|---|---|---|---|---|---|
| 1 | 0 | 0 | X | X | 0 |
| 1 | 1 | 0 | 0 | 1 | 0 |
| 1 | 0 | 1 | 0 | 1 | 0 | where X = don't care
For all other input combinations, $C_{out} = 1$

Referring to FIG. 6, in operation when all of the propagate bit lines P0, P1, P2 and P3 of a set of cells are high, transistors M47-M50 are turned on. When clock signal ∅2* goes high, transistor M46 is turned on coupling transistors M47-M50 to ground and providing a high output on the output of the inverter M66 turning on the transistor M58. When the transistor M58 is turned on, the carry-in bit $C_{in}$ to the first cell in each set of cells is transferred to the carry-out bit line C3 of the fourth cell in each set of cells, thereby bypassing all of the cells in the set. Similarly, regardless of the condition of the propagate bit lines P0 and P3, if the propagate bits P1 and P2 of a set of cells are high, the transistors M62 and M64 are turned on. When the clock signal ∅2* goes high, transistor M65 is turned on placing a low on the input of inverter M67 turning on the transistor M57. When transistor M57 is turned on, the carry output bit C0 of the lowest order cell in a set of cells is transferred to the carry-out bit line C2 of the third cell in a set of cells, thereby bypassing two of the cells in the set and providing a significant reduction in the time it takes for propagating a carry bit from one end to the other of a multiple cell arithmetic logic unit.

While a preferred embodiment of the present invention is described above, it is contemplated that various modifications may be made thereto without departing from the spirit and scope of the present invention. Accordingly, it is intended that the above-described embodiments serve only as an illustration of the invention and that the actual scope of the invention be determined by reference to the claims hereinafter provided.

What is claimed is:

1. An arithmetic logic unit comprising:
   a plurality of sets of cells, each of said sets comprising a first, a second, a third and a fourth cell; and
   a carry bypass circuit coupled to said cells in each set, wherein each of said cells comprises:
   a propagate circuit responsive to a predetermined bit in a first operand T, a predetermined bit in a second operand B, a plurality of code bits (G0-G3) and a clock signal ∅1 for selectively providing a propagate bit P;
   a kill circuit responsive to said predetermined bits in said first and said second operands T and B, a clock signal ∅1* which comprises an inverted form of said clock signal ∅1, said propagate bit P and a carry-in bit $C_{in}$ on a carry-in bit line for selectively providing a carry-out bit $C_{out}$ on a carry-out bit line; and
   a sum circuit responsive to said propagate bit P, said carry-in bit $C_{in}$ and a code bit G4 for selectively providing a sum bit NS wherein $NS = P \oplus G4 \cdot C_{in}$; and said carry bypass circuit comprises:
   a first bypass circuit responsive to said propagate bit P from said propagate circuit in each of said first, said second, said third and said fourth cells, said carry-in bit $C_{in}$ on said carry-in bit line of said first cell and a clock signal ∅2* for providing said carry-out bit $C_{out}$ on said carry-out bit line of said fourth cell; and
   a second bypass circuit responsive to said propagate bit P from said propagate circuits in said second and said third cells, said clock signal ∅2* and said carry-out bit $C_{out}$ on said carry-out bit line of said first cell for providing said carry-out bit $C_{out}$ on said carry-out bit line of said third cell.

2. An arithmetic logic unit according to claim 1 wherein said propagate circuit comprises a plurality of transistors which are responsive to predetermined combinations of said predetermined bits of said first and said second operands T and B and predetermined combinations of said plurality of code bits (G0-G3) for selectively providing said propagate bit P.

3. An arithmetic logic unit according to claim 2 wherein said plurality of transistors comprise a means for coupling predetermined ones of said transistors to a source of said code bits (G0-G3) and means responsive to said predetermined bits of said first and said second operands T and B for selectively providing said propagate bit P.

4. An arithmetic logic unit according to claim 1 wherein said kill circuit comprises a node A on said carry-out bit line; means responsive to said clock signal ∅1 for precharging said node A to a first predetermined potential and means responsive to said clock signal ∅1*, said predetermined bits of said first and said second operand T and B, said propagate bit P and said carry-in bit $C_{in}$ for selectively discharging said node A to a second predetermined potential.

5. An arithmetic logic unit according to claim 4 wherein said discharging means comprises:

first means for discharging said node A when said predetermined bits of said first and second operand T and B are at said second predetermined potential; and second means for discharging said node A when said bit of one of said operands T and B is at said first predetermined potential, said bit of the other of said operands T and B is at said second predetermined potential, said propagate bit P is at said first predetermined potential and said carry-in bit $C_{in}$ is at said second predetermined potential.

6. An arithmetic logic unit according to claim 1 wherein said sum circuit comprises:
a NAND circuit responsive to said carry-in bit $C_{in}$ and said code bit G4 for providing an output and an exclusive OR circuit responsive to said output of said NAND circuit and said propagate bit P for providing said sum bit NS, wherein $NS = P \oplus G4 \cdot C_{in}$.

7. An arithmetic logic unit comprising:
a plurality of cells wherein each of said cells comprises:
first circuit means responsive to a predetermined bit in a first operand T, a predetermined bit in a second operand B, a plurality of code bits (G0–G3) and a clock signal $\emptyset 1$ for providing a propagate bit P;
second circuit means responsive to said propagate bit P, a code bit G4 and a carry-in bit $C_{in}$ for providing a sum bit NS, wherein $NS = P \oplus G4 \cdot C_{in}$, G4=0 and NS=P when said arithmetic logic unit is performing a logical operation and G4=1 and $NS = P \oplus C_{in}$ when said arithmetic logic unit is performing an arithmetic operation; and
third circuit means responsive to said predetermined bit in said first operand T, said predetermined bit in said second operand B, said propagate bit P, a clock signal $\emptyset 1^*$ which comprises an inverted form of said clock signal $\emptyset 1$, and said carry-in bit $C_{in}$ for providing a carry-out bit $C_{out}$.

8. An arithmetic logic unit according to claim 7 wherein said third circuit means comprises:
a node A corresponding to said carry-out bit $C_{out}$;
means for precharging said node A to a first predetermined potential; and
means responsive to said predetermined bit in said first operand T, said predetermined bit in said second operand B, said propagate bit P, said clock signal $\emptyset 1^*$ and said carry-in bit $C_{in}$ for discharging said node A to a second predetermined level when said predetermined bits in said first and said second operands T and B are at said second predetermined potential and when one of said predetermined bits is at said second predetermined potential, the other, one of said predetermined bits is at said first predetermined potential, said propagate bit P is at said first predetermined potential and said carry-in bit $C_{in}$ is at said second predetermined potential.

9. An arithmetic logic unit according to claim 7 wherein said plurality of cells are grouped in sets of four cells, each of said sets comprises a first, a second, a third and a fourth one of said plurality of cells and further comprising:
a bypass circuit coupled to each of said sets wherein each of said bypass circuits comprises means responsive to said propagate bit P from predetermined ones of said first, said second, said third and said fourth cell in each of said sets, said carry-in bit applied to a predetermined one of said first, said second, said third and said fourth cell in each of said sets, and a clock signal $\emptyset 2^*$ for providing said carry-out bit $C_{out}$ from a predetermined one of said first, said second, said third and said fourth cell in each of said sets.

10. An arithmetic logic circuit according to claim 9 wherein said bypass circuit comprises:
a first bypass circuit responsive to said propagate bit P from each of said first, said second, said third and said fourth cells, said carry-in bit $C_{in}$ applied to said first cell and said clock signal $\emptyset 2^*$ for providing said carry-out bit $C_{out}$ from said fourth cell; and
a second bypass circuit responsive to said propagate bit P applied to said second and said third cells, said clock signal $\emptyset 2^*$ and said carry-out bit $C_{out}$ from said first cell for providing said carry-out bit $C_{out}$ from said third cell.

11. An arithmetic logic unit according to claim 8 comprising means responsive to said propagate bit P from certain cells in a set of said cells, a carry-in bit $C_{in}$ applied to a first cell in said set and a clock signal $\emptyset 2^*$ for providing said carry-out bit $C_{out}$ from a fourth cell in said set.

12. An arithmetic logic unit according to claim 11 wherein said set comprises a first, a second, a third, and a fourth cell coupled in series, and said carry-out bit providing means comprises means for selectively causing said carry-in bit to bypass four of said cells in a set when all of said propagate bits have a first predetermined potential and to bypass two of said cells in said set when the middle two of said propagate bits have said first predetermined potential.

13. An arithmetic logic unit comprising:
a plurality of sets of cells wherein each of said sets comprises a first, a second, a third and a fourth one of said cells and each of said cells comprises:
first circuit means responsive to a predetermined bit in a first operand T, a predetermined bit in a second operand B, a plurality of code bits (G0–G3) and a clock signal $\emptyset 1$ for providing a propagate bit P; and
second circuit means responsive to said propagate bit P, a code bit G4 and a carry-in bit $C_{in}$ for providing a sum bit NS, wherein $NS = P \oplus G4 \cdot C_{in}$, G4=0 and NS=P when said arithmetic logic unit is performing a logical operation and G4=1 and $NS = P \oplus C_{in}$ when said arithmetic logic unit is performing an arithmetic operation; and
a bypass circuit coupled to each of said sets wherein each of said bypass circuits comprises means responsive to said propagate bit P from predetermined one of said first, said second, said third and said fourth cell in each of said sets, said carry-in bit applied to a predetermined one of said first, said second, said third and said fourth cells in each of said sets, and a clock signal $\emptyset 2^*$ for providing said carry-out bit $C_{out}$ from a predetermined one of said first, said second, said third and said fourth cell in each of said sets.

14. An arithmetic logic circuit according to claim 13 wherein said bypass circuit comprises:
a first bypass circuit responsive to said propagate bit P from each of said first, said second, said third and said fourth cells, said carry-in bit $C_{in}$ applied to said first cell and said clock signal $\emptyset 2^*$ for providing said carry-out bit $C_{out}$ from said fourth cell; and
a second bypass circuit responsive to said propagate bit P applied to said second and said third cells, said clock signal $\emptyset 2^*$ and said carry-out bit $C_{out}$ from said first cell for providing said carry-out bit $C_{out}$ from said third cell.

15. An arithmetic logic unit according to claim 13 comprising:

third circuit means responsive to said predetermined bit in said first operand T, said predetermined bit in said second operand B, said propagate bit P, a clock signal $\emptyset 1^*$ which comprises an inverted form of said clock signal $\emptyset 1$, and said carry-in bit $C_{in}$ for providing a carry-out bit $C_{out}$;

a node A corresponding to said carry-out bit $C_{out}$;

means for precharging said node A to a first predetermined potential; and means responsive to said predetermined bit in said first operand T, said predetermined bit in said second operand B, said propagate bit P, said clock signal $\emptyset 1^*$ and said carry-in bit $C_{in}$ for discharging said node A to a second predetermined level when said predetermined bits in said first and said second operands T and B are at said second predetermined potential and when one of said predetermined bits is at said second predetermined potential, the other one of said predetermined bits is at said first predetermined potential, said propagate bit P is at said first predetermined potential and said carry-in bit $C_{in}$ is at said second predetermined potential.

16. An arithmetic logic unit comprising:

a plurality of cells wherein each of said cells comprises:

first circuit means responsive to a predetermined bit in a first operand T, a predetermined bit in a second operand B, a plurality of code bits (G0-G3) and a clock signal $\emptyset 1$ for providing a propagate bit P;

second circuit means reponsive to said propagate bit P, a code bit G4 and a carry-in bit $C_{in}$ for providing a sum bit NS, wherein $NS = P \oplus G4 \cdot C_{in}$, G4=0 and NS=P when said arithmetic logic unit is performing a logical operation and G4=1 and $NS = P \oplus C_{in}$ when said arithmetic logic unit is performing an arithmetic operation; and third circuit means responsive to said predetermined bit in said first operand T, said predetermined bit in said second operand B, said propagate bit P, a clock signal $\emptyset 1^*$ which comprises an inverted form of said clock signal $\emptyset 1$, and said carry-in bit $C_{in}$ for providing a carry-out bit $C_{out}$;

a node A corresponding to said carry-out bit $C_{out}$;

means for precharging said node A to a first predetermined potential; and means responsive to said predetermined bit in said first operand T, said predetermined bit in said second operand B, said propagate bit P, said clock signal $\emptyset 1^*$ and said carry-in bit $C_{in}$ for discharging said node A to a second predetermined level when said predetermined bits in said first and said second operands T and B are at said second predetermined potential and when one of said predetermined bits is at said second predetermined potential, the other one of said predetermined bits is at said first predetermined potential, said propagate bit P is at said first predetermined potential and said carry-in bit $C_{in}$ is at said second predetermined potential.

* * * * *